US012807078B2

(12) United States Patent
Stöwesand et al.

(10) Patent No.: US 12,807,078 B2
(45) Date of Patent: Nov. 24, 2026

(54) PAD WITH SPEAKER RETENTION BRACKET

(71) Applicant: Lear Corporation, Southfield, MI (US)

(72) Inventors: Frank Stöwesand, Oberding-Schwaig (DE); Klaus Lamecker, Oberding-Schwaig (DE); Martin Bahnemann, Oberding-Schwaig (DE); Holger Schrödersecker, Oberding-Schwaig (DE); Philipp Von Massow, Oberding-Schwaig (DE)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 18/602,476

(22) Filed: Mar. 12, 2024

(65) Prior Publication Data

US 2024/0217450 A1 Jul. 4, 2024

Related U.S. Application Data

(63) Continuation of application No. 17/484,616, filed on Sep. 24, 2021, now Pat. No. 11,958,415.

(30) Foreign Application Priority Data

Dec. 18, 2020 (DE) ..................... 10 2020 134 174.1

(51) Int. Cl.
*B60R 11/02* (2006.01)
*B60N 99/00* (2006.01)
*H04R 1/02* (2006.01)

(52) U.S. Cl.
CPC .......... *B60R 11/0217* (2013.01); *H04R 1/025* (2013.01); *B60N 99/00* (2013.01); *H04R 2499/13* (2013.01)

(58) Field of Classification Search
CPC ........ B60N 2/879; B60N 2/643; B60N 99/00; B60R 11/0217; B60R 11/0223; H04R 2499/13; H04R 1/025
(Continued)

(56) References Cited

U.S. PATENT DOCUMENTS 3,512,605 A 5/1970 McCorkle
4,027,112 A * 5/1977 Heppner ................ A47C 7/727 381/301
(Continued)

FOREIGN PATENT DOCUMENTS

CN 1926912 A 3/2007
DE 4328720 A1 * 3/1995 ............. B60N 2/879
(Continued)

OTHER PUBLICATIONS

First Chinese Office Action for Chinese Application No. 2021111454008, mailed Mar. 29, 2024, 15 Pages.
(Continued)

*Primary Examiner* — Milton Nelson, Jr.
(74) *Attorney, Agent, or Firm* — Alston & Bird LLP

(57) ABSTRACT

A vehicle seat is provided with a seat pad formed of a foam material defining a seating surface for supporting an occupant and a rear surface opposite the seating surface. A speaker cavity for receiving a speaker assembly is formed in the pad and extends from the rear surface toward the seating surface. At least one speaker retention bracket is disposed in the speaker cavity. The retention bracket is co-molded with the pad so at least a portion of the retention bracket is encapsulated in foam material to retain the bracket in the cavity, the retention bracket having at least one retention feature extending within the cavity to cooperate with the speaker assembly and retain the speaker assembly in the pad. The speaker retention bracket is configured to mount a
(Continued)

speaker assembly within the cavity to allow acoustic radiation to be transmitted through the foam material to a seated occupant.

13 Claims, 3 Drawing Sheets

(58) Field of Classification Search
USPC .................................................... 403/DIG. 11
See application file for complete search history.

(56) References Cited

U.S. PATENT DOCUMENTS

| | | | | |
|---|---|---|---|---|
| 4,161,995 | A * | 7/1979 | Pohlmann | B60R 11/0217 181/149 |
| 7,159,938 | B1 | 1/2007 | Shiraishi | |
| 7,413,248 | B2 * | 8/2008 | Matsuhashi | B60R 11/0217 297/217.3 |
| 7,425,034 | B2 * | 9/2008 | Bajic | B60N 2/5635 297/180.12 |
| 7,722,116 | B2 * | 5/2010 | Takada | H04R 1/26 297/217.4 |
| 8,061,210 | B2 | 11/2011 | Crowson, II | |
| 8,816,873 | B2 | 8/2014 | Bisset et al. | |
| 9,282,409 | B2 | 3/2016 | Lee | |
| 9,539,944 | B2 | 1/2017 | Tzirkel-Hancock et al. | |
| 9,729,961 | B2 | 8/2017 | Howard et al. | |
| 9,845,059 | B2 | 12/2017 | Subat et al. | |
| 9,949,004 | B2 | 4/2018 | Cohen | |
| 10,271,119 | B2 * | 4/2019 | Fujita | A47C 7/72 |
| 2006/0036201 | A1 | 2/2006 | Cohen | |
| 2007/0014425 | A1 | 1/2007 | Matsuhashi | |
| 2009/0100654 | A1 | 4/2009 | Carps | |
| 2009/0152917 | A1 * | 6/2009 | Ostler | A47C 7/727 310/12.32 |
| 2009/0189424 | A1 | 7/2009 | Chi | |
| 2009/0295202 | A1 | 12/2009 | Takada et al. | |
| 2013/0076090 | A1 | 3/2013 | Kim | |
| 2017/0072869 | A1 | 3/2017 | Ito | |
| 2019/0215588 | A1 | 7/2019 | Morisaki et al. | |

FOREIGN PATENT DOCUMENTS

| | | | |
|---|---|---|---|
| DE | 102018006855 | A1 | 3/2020 |
| EP | 3576423 | A1 | 12/2019 |
| FR | 2665996 | A1 * | 2/1992 |
| JP | 62250798 | A * | 10/1987 |
| JP | S6380697 | A * | 4/1988 |
| JP | S6316211 | Y2 * | 5/1988 |
| JP | H0292749 | U | 7/1990 |
| JP | H0424705 | Y2 * | 6/1992 |
| JP | 2003070088 | A * | 3/2003 |
| JP | 2007125071 | A | 5/2007 |
| JP | 4060675 | B2 * | 3/2008 |
| JP | 2008295595 | A | 12/2008 |
| JP | 2009274687 | A | 11/2009 |
| JP | 2013022402 | A | 2/2013 |
| WO | 2013/118122 | A1 | 8/2013 |

OTHER PUBLICATIONS

Second Chinese Office Action for Chinese Application No. 2021111454008, mailed Oct. 1, 2024, 12 Pages.

* cited by examiner

PAD WITH SPEAKER RETENTION BRACKET

CROSS-REFERENCE TO RELATED APPLICATIONS

This application is a continuation of U.S. application Ser. No. 17/484,616 filed Sep. 24, 2021, which claims foreign priority benefits under 35 U.S.C. § 119(a)-(d) to German patent application DE 10 2020 134 174.1 filed Dec. 18, 2020, the disclosures of which are hereby incorporated in their entirety by reference herein.

TECHNICAL FIELD

The present disclosure relates to systems and methods for retaining a speaker assembly within a vehicle seat.

BACKGROUND

Occupants of a vehicle often listen to music, sports broadcasts, audio books, podcasts, other audio output while driving in their vehicles. Providing a speaker assembly in a vehicle seat may provide enhanced listening experience to the seated occupant.

SUMMARY

According to at least one embodiment, a vehicle seat is provided with a seat pad formed of a foam material defining a seating surface for supporting an occupant and a rear surface opposite the seating surface. A speaker cavity for receiving a speaker assembly is formed in the pad and extends from the rear surface toward the seating surface. At least one speaker retention bracket is disposed in the speaker cavity. The retention bracket is co-molded with the pad so at least a portion of the retention bracket is encapsulated in foam material to retain the bracket in the cavity, the retention bracket having at least one retention feature extending within the cavity to cooperate with the speaker assembly and retain the speaker assembly in the pad. The speaker retention bracket is configured to mount a speaker assembly within the cavity to allow acoustic radiation to be transmitted through the foam material to a seated occupant.

In another embodiment, the speaker cavity extends from the rear surface through to the seating surface. The retention bracket is positioned at an intermediate position within the cavity offset from the seating surface and does not project beyond the seating surface and rear surface.

In another embodiment, the retention bracket has a flange that is substantially planar and extends to define a periphery of the speaker retention bracket. At least a portion of the flange is encapsulated in the foam material of the pad to retain the retention bracket in the pad.

In another embodiment, a mounting aperture is defined inside the flange and is sized to receive the speaker assembly within the mounting aperture.

In another embodiment, the mounting aperture has at least one guidance notch configured to orient the speaker housing relative to the retention bracket during installation.

In another embodiment, the retention bracket has a ridge extending transverse to the flange toward the seating surface of the pad. The ridge has at least one indent and the retention feature is defined by the indent.

In another embodiment, the vehicle seat has the speaker assembly having a transducer within a speaker housing. The speaker housing has at least one retention member and the retention member engages the indent and retains the speaker assembly to the bracket with an interference fit.

In another embodiment, the retention member has a deflectable tab extending from the speaker housing, wherein the tab deflects as the tab is inserted through the mounting aperture and engages the indent with a snap fit.

In another embodiment, the tab has a hook-end that latches over in ridge to lock the speaker assembly to bracket.

In another embodiment, one of the retention bracket and the speaker housing defines a wire aperture configured to allow a speaker wire to connect to a speaker disposed within the speaker housing.

In another embodiment, the ridge is positioned along the flange and extends to define at least a portion of the mounting aperture.

In another embodiment, the flange of the retention bracket has a guidance feature along the periphery configured to orient of the retention bracket into the pad.

In another embodiment, the speaker retention bracket is formed of polyamide.

In another embodiment, the vehicle seat has a frame and the rear surface of the pad is positioned on the frame and configured for supporting an upper body of the occupant.

In another embodiment, the speaker cavity and retention bracket are disposed along a lumbar region of the pad.

In another embodiment, the at least one retention bracket comprises a first retention bracket and a second retention bracket disposed symmetrically about an upright centerline of the pad along first and second lateral sides.

According to at least one embodiment, method of assembling a vehicle seat is provided by co-molding a foam material with a speaker retention bracket to form a seat pad. At least a portion of the retention bracket is encapsulated in the foam material so the bracket is positioned in a speaker cavity sized for receiving a speaker assembly. The retention bracket has at least one retention feature extending within the cavity to cooperate with the speaker assembly and retain the speaker assembly in the pad.

In another embodiment, the speaker assembly is inserted into cavity from a front surface of the retention bracket.

In another embodiment, the speaker assembly is retained to the retention bracket with an interference fit.

In another embodiment, a second retention bracket is co-molded symmetrically within the seat pad.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
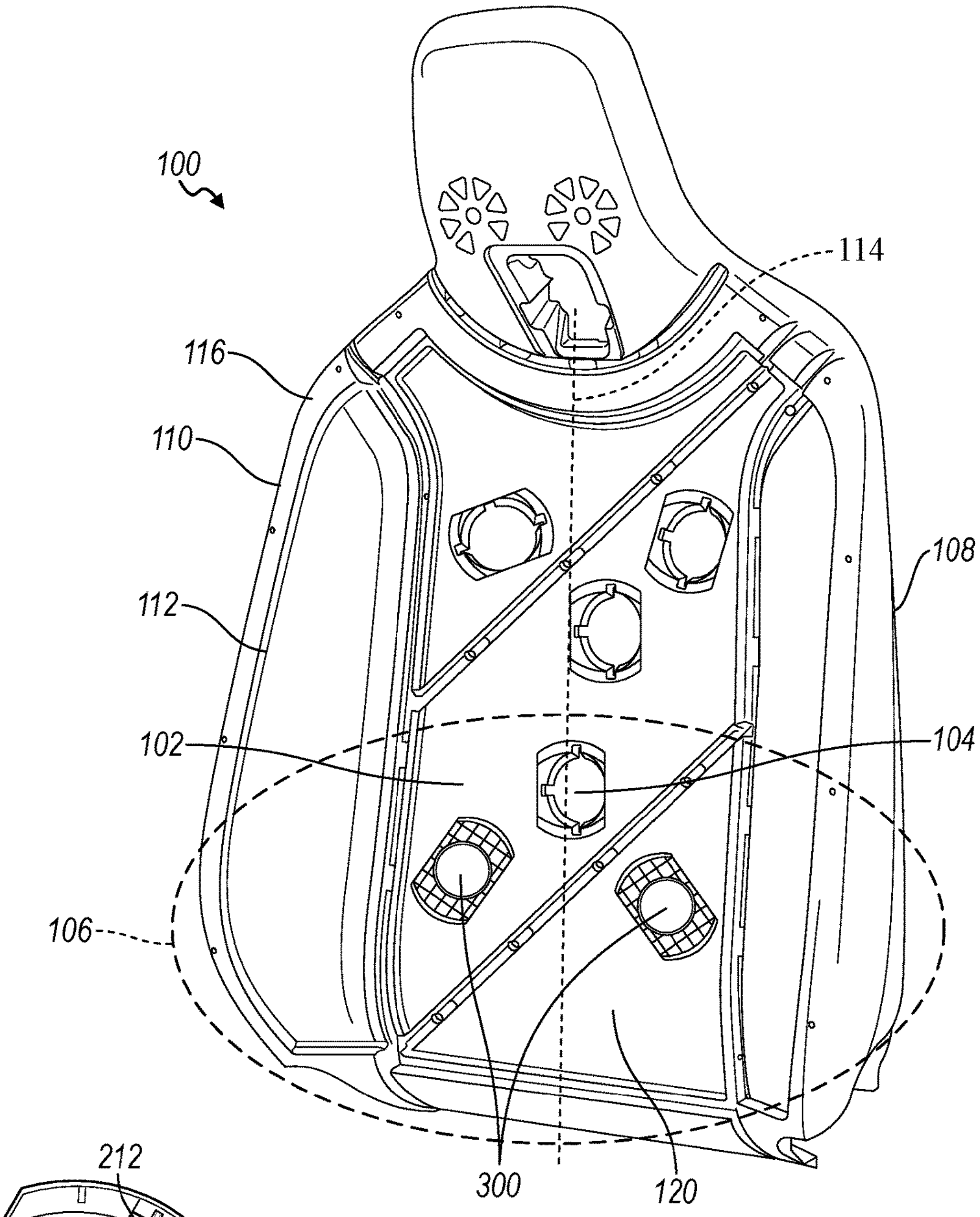
FIG. 1 illustrates a front view of a vehicle seat assembly having a speaker assembly in a seat pad assembly, according to one embodiment.

FIG. 1 illustrates a front view of a vehicle seat assembly 100 having a speaker assembly 300 mounted in a seat pad 102. While FIG. 1 illustrates a seatback 112, the speaker assembly 300 may be mounted in a pad of a seat bottom, or other suitable pad for transmitting acoustic vibration to the occupant. In one embodiment, the speaker assembly 300 may be shaker speaker, or tactile transducer that emits low frequency bass output. Very low frequency vibrations may not be heard by the ears, but the low frequency vibrations may be felt by the seated occupant. By mounting the speaker assembly 300 in the pad 102, the low frequency signals may enhance the listening experience by providing an additional level of sensory perception to the audible output. However, in a vehicle, the vehicle seat assembly 100 and speaker assembly 300 must still meet all safety regulations to protect the seated occupant.

The seat pad 102 is formed of a foam material. For example, the seat pad 102 may be formed of polyurethane foam. The seat pad 102 may be formed of any suitable foam material that provides required comfort and support of the occupant. Foam materials may also be chosen that meet emission requirements. The foam material is able to be injection molded to form to the shape of the seat pad 102.

Figure 1A:
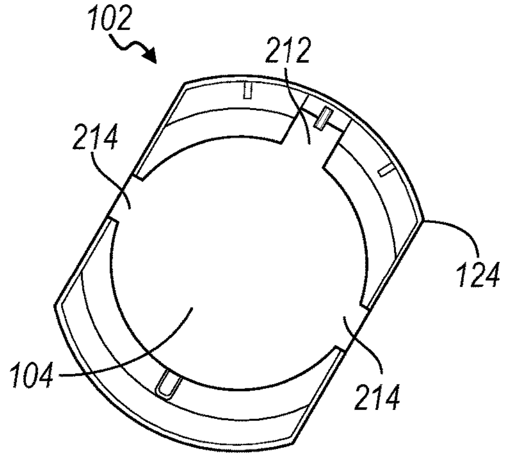
FIG. 1A illustrates a front view of a portion of the vehicle seat assembly in FIG. 1 showing a cavity in the seat pad with the speaker assembly removed.

As shown in more detail in FIG. 1A, the pad 102 defines a speaker cavity 104. The speaker cavity 104 is sized to receive a speaker retention bracket 200 for mounting the speaker assembly 300. The speaker cavity 104 may be sized to expose a portion of a speaker retention bracket co-molded with the vehicle seat assembly 100 within the speaker cavity 104.

The seat pad 102 further defines a lumbar section 106 along a lower region of the seatback 112 for supporting the lumbar region of an occupant's spine. The speaker cavity 104 may be defined in the lumbar section 106. The lower area of the occupants back along the lumbar region 106 is one of the most sensitive regions in the human body and most sensitive to low frequency acoustic vibrations from the speaker assembly 300.

Figure 2:
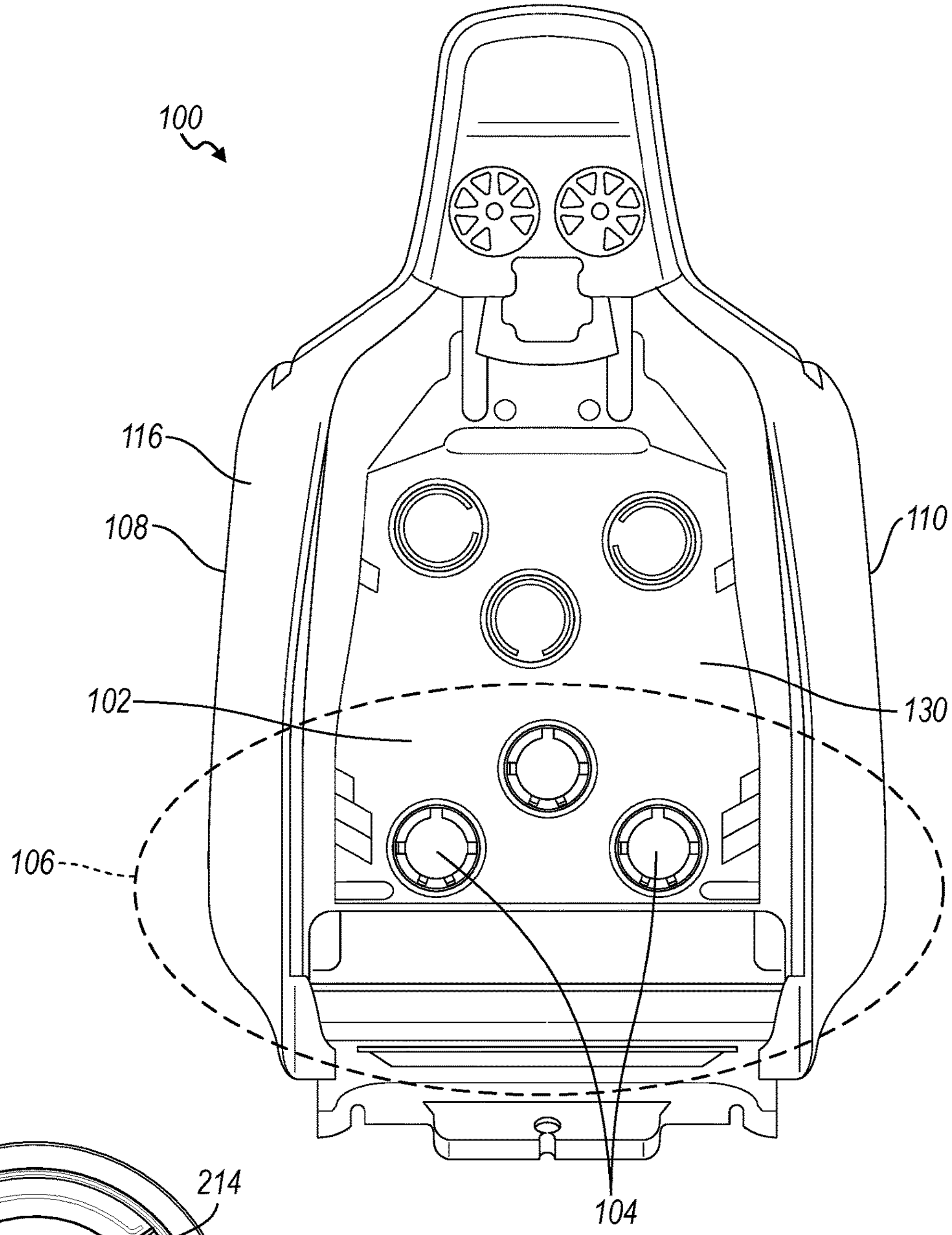
FIG. 2 illustrates a rear view of the vehicle seat of FIG. 1.

The pad 102 may have a plurality of speaker cavities 104. The speakers may be positioned symmetrically about a centerline 114 of the seatback 112. As illustrated in FIGS. 1-2, one of the of speaker cavities 104 may be disposed within a left section 108, while another of the plurality of speaker cavities 104 may be disposed within a right section 110.

Figure 2A:
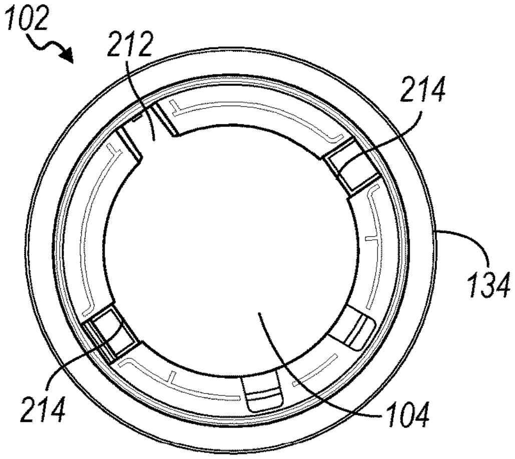
FIG. 2A illustrates the rear view of a portion of the vehicle seat assembly in FIG. 2 showing the rear view of the cavity in the seat pad with the speaker assembly removed.

The pad 102 defines a seat surface 120. The seat surface 120 defines the seating surface for supporting the occupant. As illustrated in FIG. 1, the seat surface 120 defines a front seat surface having a contour including a central seating surface and side bolster surfaces. The speaker cavity 104 may extend from the front seating surface 120 to a rear pad surface 130 opposite the seating surface 120, as shown in FIG. 2. The speaker cavity 104 may be configured to receive a speaker assembly from the front seating surface 120, as shown in FIG. 1. FIG. 2A illustrates the rear view of the speaker cavity 104. A forward opening 124 of the cavity 104, shown in FIG. 1A, has a different shape than a rear opening 134, shown in FIG. 2A. The front opening shape 124 may be asymmetric to facilitate installation of the speaker assembly 300 in the correct orientation.

Figure 3:
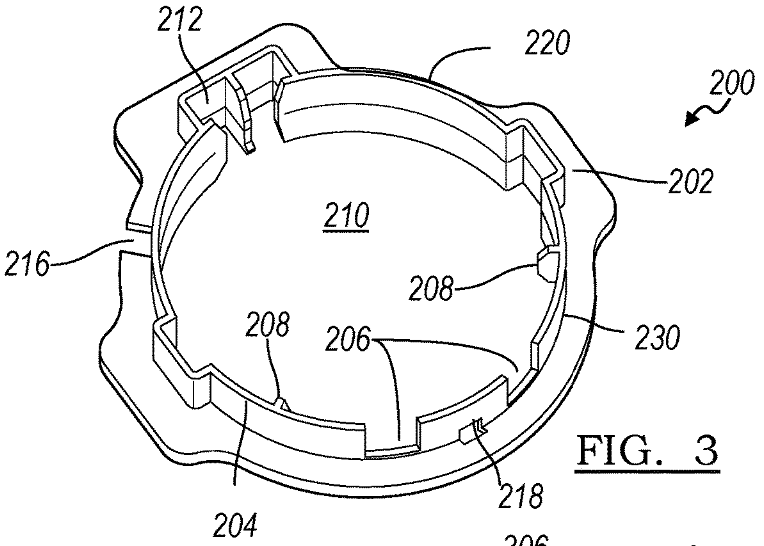
FIG. 3 illustrates the rear perspective view of a speaker retention bracket for use in the vehicle seat assembly of FIG. 1.

FIG. 3 illustrates the rear view of a speaker retention bracket 200. The retention bracket 200 is configured to mount a speaker assembly within the speaker cavity 104 to allow acoustic radiation to be transmitted through the foam material to a seated occupant. The retention bracket 200 may be formed of a plastic. The retention bracket 200 may be generally rigid plastic and sufficiently stiff in to allow transmission of the vibrations in all intended directions of motion from the speaker assembly 300 having a shaker or tactile transducer. In one embodiment, the retention bracket 200 may be formed of a plastic composite with glass fiber. In another embodiment, the retention bracket 200 may be formed of a plastic composition such as a polyamide composition. The polyamide plastic allows for the bracket 200 to sufficiently bond to the foam material of the seat pad 102 during co-molding so that the bracket 200 cannot be easily removed. The retention bracket 200 must be secured to the pad 102 sufficiently to withstand the speaker assembly 300 being installed and replaced for service without destroying the seat pad 102 and ensuring the bracket 200 remains adhered to the pad 102. In one example, the retention bracket 200 may be formed of polyamide— nylon 6, 6-30% glass fiber. The bracket 200 formed of polyamide with glass fiber may be able to securely bond with the foam pad and rigid enough to support the speaker assembly 300. Further, an embodiment having a polyamide retention bracket 200 may be suitable to adhere the retention bracket 200 into the pad 102 with adhesive substances. In another embodiment, the retention bracket 200 may be formed of composite material, or any suitable material for being secured to the pad 102 and retaining the speaker assembly 300.

The retention bracket 200 is at least partially encapsulated in the foam material of the pad 102. The retention bracket 200 is positioned in an intermediate position within the speaker cavity 104. As such, a speaker assembly 300 is installed within the retention bracket 200 so as to not project beyond a predetermined threshold location. The predetermined threshold location may be beyond the seating surface 120. Additionally, or alternatively, the predetermined threshold location may be the rear pad surface 130.

The retention bracket 200 has a flange 202. As illustrated, in FIG. 3 the flange 202 may be substantially flat and planar. The flange 202 extends to define a periphery of the speaker retention bracket 200. At least a portion of the flange 202 is encapsulated in the foam material of the pad 102 to retain the retention bracket 200 in the pad 102 when the pad 102 is co-molded with the retention bracket 200.

Figure 4:
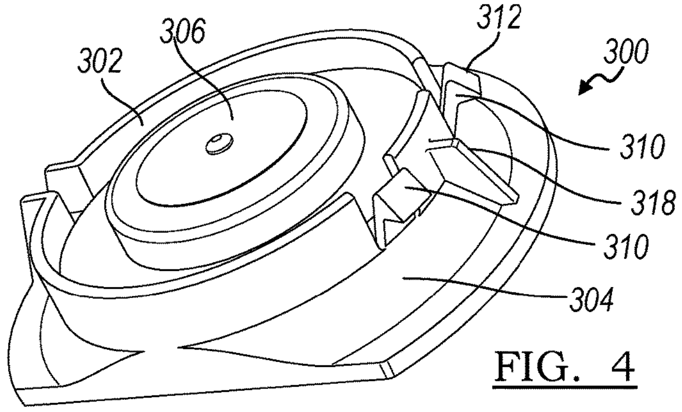
FIG. 4 illustrates a perspective view of a speaker assembly for mounting in the vehicle seat assembly of FIG. 1.

FIG. 4 illustrates the rear view of a speaker assembly 300. The speaker assembly 300 has a transducer body 306 for producing the acoustic output and converting the electrical input to a mechanical output. The retention bracket 200 defines a mounting aperture 210 inside the flange 202 and is sized to receive at least the transducer body 306 of the speaker assembly 300.

The retention bracket 200 has a ridge 204 that extends transversely from the flange 202. The ridge 204 may define the mounting aperture 210. The ridge 204 may include indents 206 that extend less from the flange 202 than adjacent ridge segments. The indents 206 may be configured to interact with retention members 310 of the speaker assembly 300 to retain the speaker assembly 300 to the retention bracket 200 and thereby retain the speaker assembly 300 in the pad 102.

For example, as illustrated in FIG. 4, the retention member 310 may be a deflectable tab extending from the speaker housing 302. Each tab deflects inward as it is inserted through the mounting aperture 210 and then returns to engage the indent 206 and retain the speaker assembly 300 to the retention bracket 200 with an interference fit, such as a snap-fit. In some embodiments, the deflectable tabs may interact with portions of the perimeter of the retention bracket 200 defining the speaker cavity 104.

As further illustrated in FIG. 4, the retention member 310 may have a locking portion 312. The locking portion 312 has a hook-end that latches over the ridge 204 to latch over the indents 206.

The speaker retention bracket 200 further defines a front bracket surface 220 and a rear bracket surface 230. The speaker retention bracket 200 may be disposed in the pad 102 such that the front bracket surface 220 is offset from the seating surface 120, and the rear bracket surface 230 is offset from the rear pad surface 130.

The speaker retention bracket 200 may also have support members 208. The support members 208 may be used to support the speaker assembly when inserted in the speaker retention bracket 200.

The speaker retention bracket 200 may also have at least one guidance notch 212 extending outward from the mounting aperture 210. The guidance notch 212 may cooperate with a guidance key 316 on the speaker assembly 300 to orient the speaker assembly 300 during installation of the speaker assembly into the speaker retention bracket 200.

FIG. 4 illustrates a speaker assembly 300. The speaker assembly 300 comprises a speaker housing 302 and a contact surface 304. The mounting aperture 210 of the speaker retention bracket 200 may be sized such that the contact surface 304 may be unable to pass through the mounting aperture 210 and the contact surface 304 abuts the flange 202 along the front surface 220.

Figure 5:
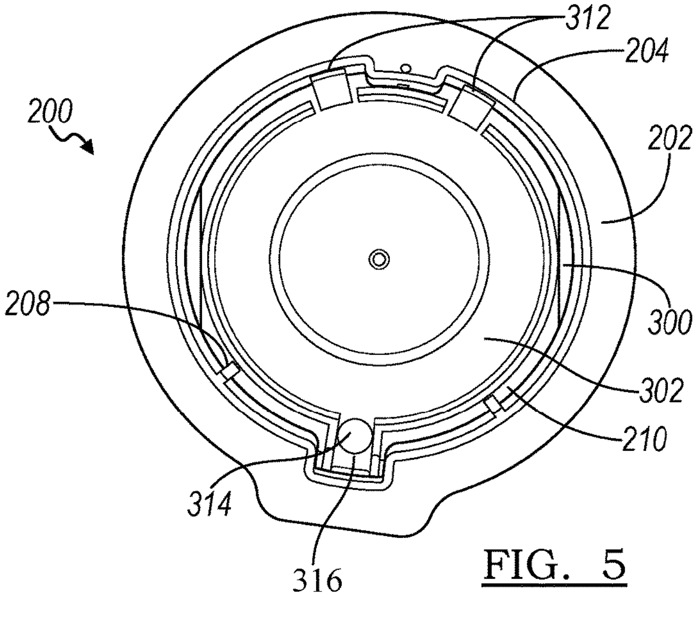
FIG. 5 illustrates a rear view of the retention bracket mounted to the speaker assembly and removed from the vehicle seat assembly.

As shown in FIG. 5, the speaker assembly 300 is secured to the retention bracket 200. When the speaker assembly 300 is inserted in the speaker retention bracket 200, the locking portion 312 may snap over the indent 206 of speaker retention bracket 200, and act to secure the speaker assembly 300 into the speaker retention bracket 200.

The speaker assembly 300 may have a wire aperture 314 configured to allow a speaker wire to enter the speaker assembly 300. The speaker assembly 300 further comprises a guidance key 316 sized to fit within the guidance notch 212 of speaker retention bracket 200. When the guidance key 316 is disposed within the guide notch, 212, both the radial and lateral movement of the speaker assembly 300 may be restricted in respects to the speaker retention bracket 200, thereby securely attaching the speaker assembly 300 within the pad 102. After the speaker assembly 300 is inserted into the speaker retention bracket 200, support member 208 may contact the speaker housing 302 to further restrain lateral movement of the speaker assembly 300.

The speaker assembly 300 may have a retention rib 318. As shown, the retention rib extends between the retention members 310. The rib 318 may cooperate with a corresponding retention slot 218 in the bracket 200, as shown in FIG. 5

The vehicle seat assembly 100 in FIGS. 1-5 is formed by co-molding the foam material of the pad 102 with the speaker retention bracket 200 to form a seat pad assembly 116. The retention bracket 200 is positioned in a mold tool for the pad 102. The flange 202 has a cut-out 216 extending inward from the periphery that provides a poke-yoke feature to ensure the retention bracket 200 is oriented in the correct position within the mold tool. The retention bracket 200 may also have additional notches 214 extending outward from the mounting aperture 210. The perimeter of the retention bracket 200 may have protrusions adjacent the notches 214. The notches 214 and corresponding protrusions help ensure the retention bracket 200 does not rotate relative to the pad 102 or the mold tool.

The foam material is injected into the tool and encapsulates at least a portion of the retention bracket in the foam material. The seat pad assembly 116 provides the retention bracket 200 positioned in the speaker cavity 104 formed during injection molding. The co-molding process allows the retention bracket 200 and the pad 102 to be formed of two-different materials both with separate functional and mechanical properties.

The speaker assembly 300 is inserted into cavity after the seat pad assembly 116 is molded. The speaker assembly 300 is retained in the pad 102 by mating to the retention bracket 200 with an interference fit. The interference fit between the speaker assembly 300 and the retention bracket 200 allows the speaker assembly 300 to be retained in the seat assembly 100 without separate mounting hardware.

The pad 102 may be supported by a seat frame. For example, the rear pad surface 130 may be positioned on the seat back frame. The pad 102 may also be covered with a trim material such as fabric or leather, for example.

The Following are a List of Reference Numerals:

100—vehicle seat assembly
102—seat pad
104—speaker cavity
106—lumbar section
108—left section
110—right section
112—seatback
114—centerline
120—front seating surface
124—front cavity opening
130—rear pad surface
134—rear cavity opening
200—speaker retention bracket
202—flange
204—ridge
206—indent
208—support member
210—mounting aperture
212—guidance notch
214—opposing notch
216—periphery cut-out
218—slot
220—front bracket surface
230—rear bracket surface
300—speaker assembly
302—speaker housing
304—contact surface
306—transducer body
310—retention member
312—locking portion
314—wire aperture
316—guidance key
318—stop tab While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:

one or more speaker retention brackets defined within a seat foam pad of a seat assembly, wherein each of the one or more retention brackets comprises at least one retention feature comprising a plurality of indents; and a speaker assembly comprising a plurality of extended retention members, the speaker assembly is retained by each of the one or more speaker retention brackets, wherein the at least one retention feature is configured to cooperate with the speaker assembly such that each of the plurality of extended retention members is configured to engage with a respective indent of the plurality of indents on the one or more speaker retention bracket, and retain the speaker assembly in the seat foam pad, and wherein the speaker assembly is configured to emit vibrations.

2. The system of claim 1, wherein the speaker assembly further comprises at least one of a shaker speaker or a tactile transducer.

3. The system of claim 2, wherein the at least one of the shaker speaker or the tactile transducer is configured to emit a low frequency output.

4. The system of claim 1, wherein the one or more speaker retention brackets are disposed within a left section of a centerline of a seatback and within a right section of the centerline of a seatback.

5. The system of claim 1, wherein the speaker assembly is disposed in a lumbar section of the seat foam pad.

6. The system of claim 1, wherein the one or more speaker retention brackets are configured to transmit the vibrations in all intended directions of motion from the speaker assembly.

7. The system of claim 1, wherein the one or more speaker retention brackets further comprise a flange that is substantially planar and extends to define a periphery of the one or more speaker retention brackets, and wherein at least a portion of the flange is encapsulated in foam material of the seat foam pad to retain the one or more speaker retention brackets in the seat foam pad.

8. The system of claim 7, wherein a mounting aperture is defined inside the flange and is sized to receive the speaker assembly within the mounting aperture.

9. The system of claim 1, wherein the at least one retention feature comprises a ridge extending transversely, and wherein at least one indent of the plurality of indents is positioned within the ridge.

10. The system of claim 9, wherein the at least one indent extends less from the at least one retention feature than adjacent portions of the ridge.

11. The system of claim 1, wherein the one or more speaker retention brackets are co-molded in the seat foam pad.

12. The system of claim 1, wherein each of the plurality of extended retention members is configured to engage with the respective indent via an interference fit.

13. The system of claim 12, wherein the interference fit comprises a snap-fit engagement.

* * * * *